United States Patent [19]

Becker et al.

[11] Patent Number: 4,581,829
[45] Date of Patent: Apr. 15, 1986

[54] RECOMPRESSION STAGED EVAPORATION SYSTEM

[75] Inventors: Frederick E. Becker, Reading; Alexandra I. Zakak, Newton, both of Mass.

[73] Assignee: Gas Research Institute, Chicago, Ill.

[21] Appl. No.: 633,754

[22] Filed: Jul. 23, 1984

[51] Int. Cl.[4] .............................................. F26B 7/00
[52] U.S. Cl. .......................................... 34/15; 34/86; 260/412.6
[58] Field of Search ....................... 34/86, 212, 15, 35; 62/238.6, 268; 237/12.1; 165/DIG. 12; 260/412.6; 202/174; 159/17 R

[56] References Cited

U.S. PATENT DOCUMENTS

| 2,200,379 | 5/1940 | Williams | 34/86 |
| 3,962,873 | 6/1976 | Davis | 60/641 |
| 4,087,974 | 5/1978 | Vaughan | 60/618 |
| 4,259,252 | 3/1981 | Perry et al. | 260/412.6 |
| 4,361,590 | 11/1982 | Wojcik | 426/480 |

FOREIGN PATENT DOCUMENTS

| 987173 | 5/1949 | France | 38/86 |
| 2425043 | 1/1980 | France | 34/86 |
| 2034012 | 2/1983 | United Kingdom | |

OTHER PUBLICATIONS

Becker, F. E. and Sakhuja, R. K., "Development of an Open Cycle Vapor Compression Heat Pump System", 1981 International Gas Research Conference.

Primary Examiner—Henry Bennett
Attorney, Agent, or Firm—Herbert Messenger

[57] ABSTRACT

A method and system for recapturing and utilizing low grade energy in the form of low pressure vapors generated in an industrial evaporation process. A prime mover drives a screw compressor and concurrently provides heat at several levels which is utilized in a staged evaporation system in accordance with the requirements of the stages of the system. The screw compressor recompresses the contaminated vapors to a pressure and temperature sufficient to evaporate the major fraction of moisture to be removed in the industrial evaporation process.

7 Claims, 3 Drawing Figures

RECOMPRESSION STAGED EVAPORATION SYSTEM

BACKGROUND OF THE INVENTION

This invention relates in general to the recapture and utilization of low-grade energy generated in an industrial process, which energy is usually discarded. More particularly, low pressure vapors generated from waste heat in the industrial process are recompressed by a screw compressor with the unique capability of handling wet and contaminated vapors, and returned to a staged evaporation system in accordance with the requirements of the system.

There are many processes in the chemical, petroleum, food and paper industries in which steam, usually at low pressure and often contaminated, is generated in large quantities. Discarding such steam as by venting it to the environment, for example, is not only wasteful of the energy, but undesirable because of air pollution problems. Likewise, condensing the steam and delivering the condensate to a treatment plant for disposal is equally undesirable because of added capital and operating costs in addition to the energy waste. By mechanical vapor recompression, this waste low-pressure steam or other vapor, or low-grade heat which can be used to produce low-pressure steam, can be recompressed to raise the pressure to a useful process level.

High recovery efficiency is attained because most of the energy contained in the vapor is already available to the compressor as latent heat, and thus only a small amount of additional work has to be done on the steam to raise its pressure to the desired level.

Various compressor drives, such as reciprocating engines, gas turbines, steam turbines, or electric motors may be used. With gas turbine or engine drives, optional heat recovery boilers or heat exchangers may be used to provide additional high-pressure steam and hot water for increased system efficiency.

The present invention is concerned generally with the utilization rather than the waste of such energy in a broad range of industrial evaporation processes, but will be described in connection with one of the more challenging operations, namely, the rendering of animal byproducts in food and allied industries.

Rendering operations, as currently practiced, involve processing animal byproducts and converting them to tallow and meatmeal. The tallow is used by the chemical industry in manufacturing primarily fatty acids and other chemicals used in the soap industry. Edible meatmeal, on the other hand, is recycled back to the animals as part of their nutritional diet.

Each raw material, whether it be beef, poultry, fish, blood, etc., requires slightly different processing but, in general, an indirectly heated cooker is used to heat the raw material to evaporate the water. In most cases, clean steam at around 125 psig is used as the heat input to the cookers. Cookers may be either batch-operated or continuously operated, most new cookers being of the continuous type. Typical steam flow requirements for continuous cookers range from 8000 to 20,000 lb/hr.

In a typical continuous rendering process, raw materials, after removal of metal particles, are ground and then sent to the cooker where they are heated by steam jackets to evaporate the water. The evaporated water (contaminated steam) contains some foams and may contain ammonia, fat aerosol (0.05 percent), dimethyl sulfide, ketones, meat particles, feather particles, volatile organics, carried over sand particles, fine metals, and air (from startup operation mainly). The condensed water pH lies generally between 6.5 and 7.5 with a BOD level ranging from 1500 to 2000 and a total suspended solids range 200 to 800 ppm (TSS). The cooking operation may last several hours depending on the nature of raw materials. For processing meat or pork, 3 to 5 hours residence time is needed. Poultry needs 2 hours and blood 8 to 10 hours. It should be noted that as the water is boiled off, the remaining material boils at a higher temperature, often referred to as boiling point elevation. For example, for beef byproducts, a temperature of 65° F. above the initial boiling point temperature of 212° F., or 277° F. is required to drive off the last few percent of moisture.

After most of the moisture is removed, the processed materials are pressed and centrifuged to make the tallow. If necessary, the meatmeal goes through further grinding after the tallow has been removed.

Removing moisture in the manner described is an inefficient process. It typically takes approximately 1.5 pounds of clean boiler steam for each pound of water removed in a single stage evaporation system. The bulk of this energy (approximately 67 percent) is carried away as contaminated steam.

Multiple effect evaporative processes have been tried in an attempt to reduce the energy requirements. In rendering operations, these have generally been two-effect systems which use a sub-atmospheric preconcentrator stage heated by the low pressure contaminated steam. This technique requires a complex recirculation scheme where hot tallow is used to help recirculate the product from one stage to the other. Such techniques as recirculating the hot tallow are complex and not truly energy-efficient. The energy cost savings from this approach have usually been more than counterbalanced by increased electric energy costs associated with driving recirculation pump motors and other accessories.

The general object of the invention is the saving of energy in practicing industrial evaporation processes in which quantities of low-grade energy are generated.

Another object of the invention is the reduction of capital and operating costs in industrial evaporation processes.

Still another object of the invention is the reduction of environmental pollution discharge streams and equipment resulting from contaminated fluids generated in industrial evaporation processes.

A more particular object of the invention is to improve the efficiency of rendering operations.

Yet another particular object of the invention is the simplification and reduction of costs of rendering operations.

SUMMARY OF THE INVENTION

Basically, the invention involves the recompression of vapor driven from the feedstock in an evaporative or cooking process and the utilization of the recompressed vapor to evaporate further liquid from the feedstock. This mechanical vapor recompression of the evaporated liquid has generally been done with centrifugal compressors. However, such machines are generally limited to pressure ratios of less than 2 to 1 in a single stage. This low pressure ratio places a constraint on the type of application in which mechanical vapor recompression can be utilized; that being for applications where there are relatively low boiling point temperature elevations. Centrifugal compressors are also not well suited for compressing wet or particulate laden vapor due to severe blade erosion from the impinging particles.

A far greater range of evaporation processes may be accommodated using a dry rotary screw compressor instead of a centrifugal compressor. It is possible with a screw compressor to achieve a pressure ratio of 7 to 1 in a single stage. Additionally, the screw compressor is uniquely suited for recompressing contaminated wet vapor that may even contain particulates. This machine is thus a good candidate for mechanical vapor recompression as applied to rendering processes.

When the evaporation process is carried out in a single effect evaporation vessel, the pressure and temperature of the heating vapor must always be greater than the final boiling point temperature of the product. Often, however, the major fraction of liquid is evaporated at a much lower temperature and only a small amount of higher temperature heat is really needed to drive off the final moisture.

When the heating vapor is supplied by recompression of the recovered vapor, the pressure level to which the vapor is compressed has a significant effect on the energy input requirement. The higher the compressor outlet pressure and associated saturation temperature, the greater the compressor power input requirement. Thus, to minimize the energy input per pound of water evaporated, the recovered vapor should be recompressed to as low a pressure and associated saturation temperature level as possible, consistent with basic heat exchange design practices. This usually dictates a temperature difference between the product and heating vapor of approximately 20° F. so as not to require excessively large cooker areas to obtain the desired heat transfer.

By using a staged heating and evaporation process, the final product moisture level can be achieved without compressing all the heating vapor above the highest process temperature level. Instead, the major fraction of the recovered vapor (all the recovered vapor could be used, if desired) is recompressed only to the pressure and associated saturation temperature level at which the major fraction of water is evaporated. The final high temperature heat would be supplied by a smaller quantity of more highly recompressed recovered vapor or by other means. This approach maximizes the evaporation energy efficiency by matching the required evaporation temperature at a given point of the process to the temperature level of the available heat.

DRAWINGS

DESCRIPTION OF PREFERRED EMBODIMENTS

Figure 1:
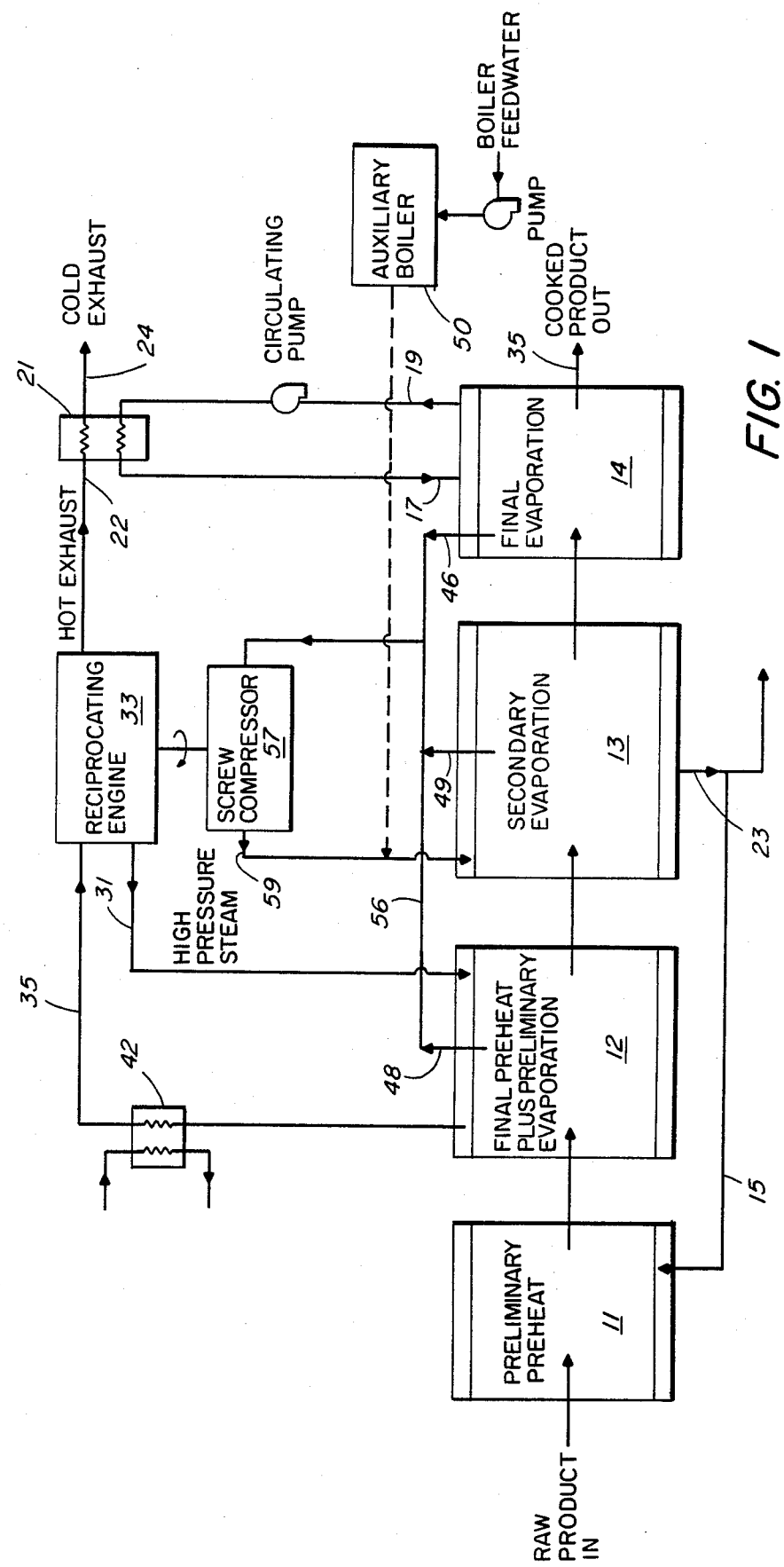
FIG. 1 is a block diagram showing schematically one version of a staged recompression system.

The block diagram of FIG. 1 represents schematically one form of the present invention. The system includes four individual compartments or stages; an initial preheating compartment 11, a second compartment 12 for final preheating and initial evaporation, a third compartment 13 for secondary evaporation, and a fourth stage or compartment 14 for final evaporation.

Figure 2:
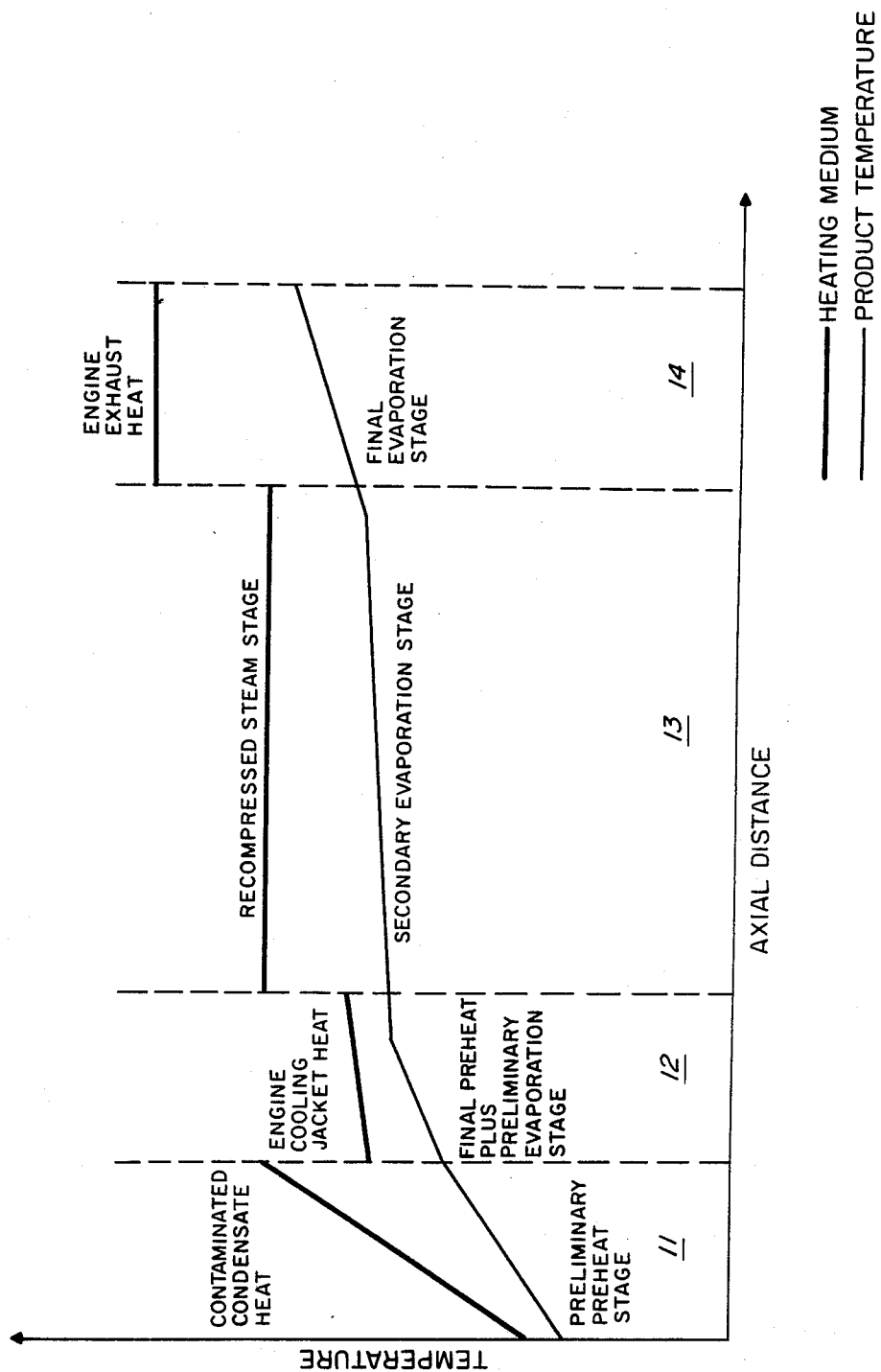
FIG. 2 is a profile of temperatures of heating medium and product in a system.

The product flows from one compartment by gravity, conveyor, pump, etc., to the next in a plug flow fashion with the temperature distribution as illustrated in FIG. 2. Initial preheating may be done by recovering heat from the hot contaminated condensate as shown and noted below. When a gas engine or gas turbine is used to drive the compressor, low pressure steam or hot water derived from the engine cooling system may provide additional preheating. Waste low pressure steam is recompressed to an intermediate pressure level for the major evaporation stage, and the final heating is achieved using high pressure steam which is derived at least in part from a boiler or heat exchanger utilizing engine exhaust gas waste heat.

Raw material of the type described above is loaded at ambient temperatures into the preheating compartment 11. The compartment may be surrounded by a water jacket having an inlet line 15 which provides hot contaminated condensate from an outlet 23 of the secondary evaporation compartment 13. Heat derived from the condensate performs the initial preheating heating function.

The material then moves to the second compartment 12 for additional preheating and initial evaporation. Low pressure steam or hot water heat for the jacket surrounding compartment 12 is derived from the cooling system of a prime mover 33. The prime mover may be fueled by gas or oil or it may be electrically driven. A gas fueled engine is preferred, however, because heat can be recovered from both the engine cooling system and exhaust gas system to give more efficient energy utilization and operating economy. Low pressure steam or hot water so derived from the cooling system leaves the engine via a line 31 and after giving up its heat to the jacket, returns via line 35. An auxiliary heat exchanger 42 may be provided to insure adequate heat rejection or cooling of the engine. Moisture driven off from the raw material in the compartment is passed through an outlet 48 to a manifold 56.

The preheated material is then moved to the third compartment 13 either as a batch or by continuous feeding. There, the temperature of the materials is raised to its boiling point where evaporation takes place for an appreciable period at almost constant temperature as copious amounts of moisture are driven from the material in the form of contaminated steam. That steam passes through an outlet 49 to the manifold 56 and thence to a screw compressor 57 which is driven by the prime mover 33.

In the screw compressor, the steam is recompressed and emerges at the compressor outlet 59. It is this recompressed steam which provides the bulk of the heat, typically to the jacket surrounding the compartment 13. Contaminated water in the form of a hot condensate is removed through an outlet 23 and passed through the line 15 for re-use in low temperature heating of the compartment 11 as previously noted.

Finally, the material is moved to a fourth stage, the final evaporation heating compartment 14. The compartment 14 also may be provided with a jacket into which steam or pressurized hot water is introduced through an inlet 17 and returned via a line 19. Steam or pressurized hot water for the inlet 17 is derived at least in part from a waste heat exchanger 21 which is heated by the engine exhaust from the prime mover 33. The hot exhaust gases enter the waste heat exchanger 21 by way of an inlet 22 and are discharged in a cooled state at an outlet 24. This high temperature heat raises the temperature of the material in the compartment 14 to its final temperature, causing the remaining moisture to be driven off through an outlet 46 to the manifold 56, and thence to the screw compressor 57.

In some instances, a start-up and auxiliary boiler 50 may be required to meet the heating requirements of compartment 13. Frequently, such a boiler may be a part of the pre-existing equipment in the facility in which the rendering operations take place. Finally, as indicated by the product outlet 35, the processed materials are removed from the final stage 14 as a useful product.

FIG. 2 illustrates the product and heating-medium temperature profile of a plug-flow, multi-stage evaporation system such as that of FIG. 1. In stage or compartment 11, the temperature of both condensate heating medium and product are increased along the length of the compartment. In stage 12, the heat from the engine cooling system increases only slightly from a temperature point somewhat less than the peak temperature of the hot condensate and the product temperature almost levels off as moisture is driven off. In stage 13, the recompressed steam temperature remains constant and the product temperature rises only slightly as the bulk of the moisture is driven off. Finally, in stage 14 the heating medium from engine exhaust is at a very high level and the product is raised to a peak temperature rather quickly.

Figure 3:
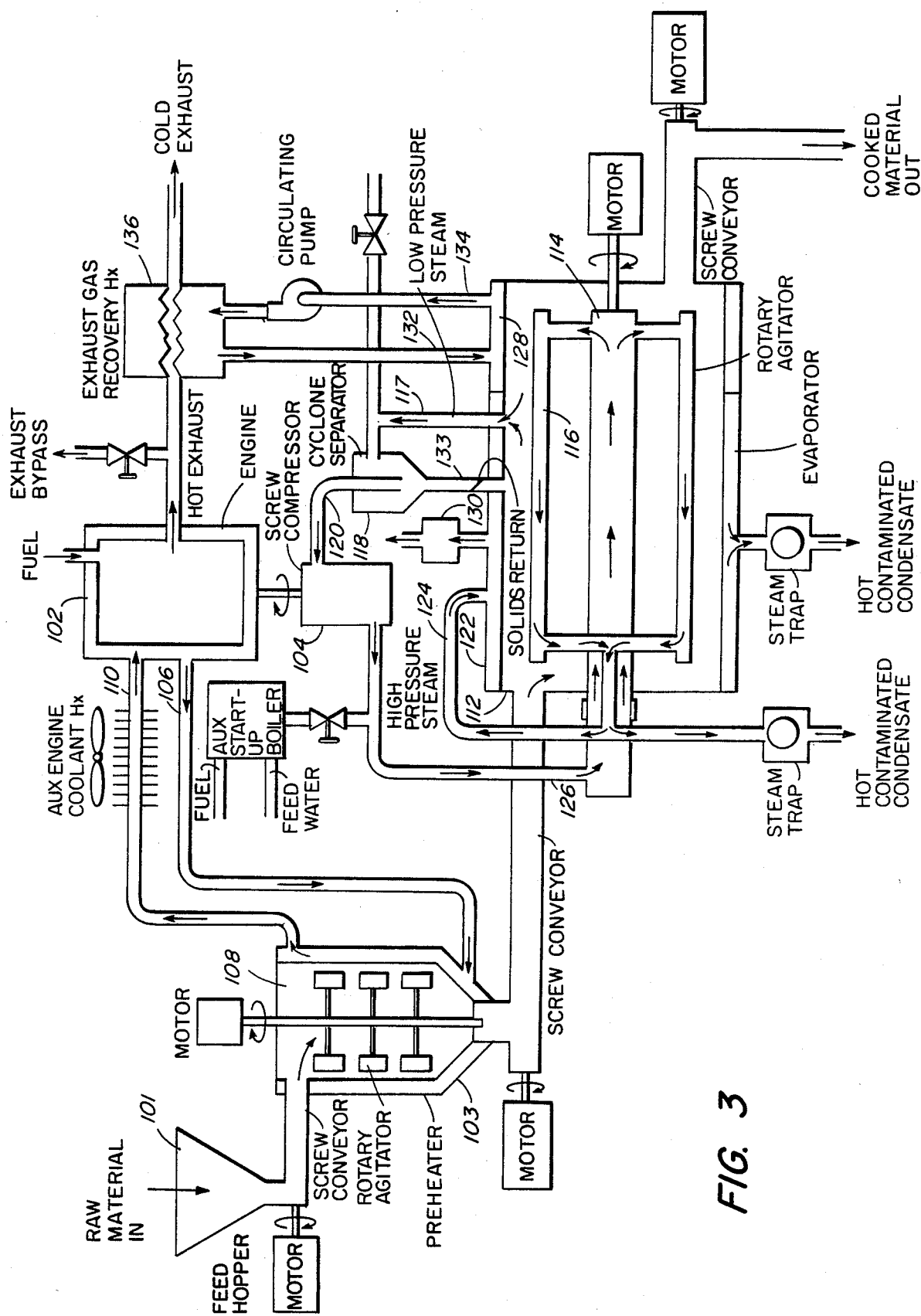
FIG. 3 is a diagrammatic showing of a practical vapor recompression evaporation system.

In the schematic illustration of FIG. 3, there may be seen one version of an integrated staged recompression system which follows the teaching of FIG. 1. When a gas-fueled prime mover is used in the system of FIG. 3, heat can be made available at three distinct temperature levels. The bulk of the heat comes from the recompressed steam and is available at an intermediate temperature level which depends upon the screw compressor outlet pressure. At 60 psia, this is approximately 290° F. The engine water jacket provides a smaller amount of heat at about 200° F. Higher temperature heat can be recovered from the engine exhaust and supplied at temperatures which may be far in excess of 300° F.

By properly matching the steam heat pump system with the cooker, all of the exhaust heat and most of the water jacket heat can be utilized. First, part of the water jacket heat is used to heat the raw materials to 180° F. The recompressed steam provides the remaining preheat and removes the major fraction of moisture. The heat recovered from the engine exhaust is used to drive off the remaining moisture.

Referring specifically to the system of FIG. 3, a prime mover 102 which may be a gas engine, drives a screw compressor 104. As in the previously described system, coolant from the engine 102 is piped via a line 106 to a water jacket 103 of a preheat section 108 of the cooker and is returned via a line 110.

Raw materials are fed into a feed hopper 101 from which they are conveyed to a preheater 103 where they are preheated to approximately 180° F. The raw materials are then conveyed to a cooker 112 and pass continuously through its length. In this instance, high pressure steam is fed to a rotating hollow shaft 114 with radially fed parallel tubes 116 to provide added heat transfer surface area. Rotation of the shaft and tubes serves to mix the material as it is heated. The material passes through the cooker wherein large quantities of moisture are driven from the materials, passed through a line 117 to a cyclone separator 118, and piped to the screw compressor 104 through a line 120.

The contaminated steam is upgraded in the screw compressor 104 and delivered to hollow shaft 114 by way of a line 126. A steam jacket 122 which surrounds the cooker gets steam via a line 124. The tubes 116, as noted, are hollow and communicate and are connected to the hollow shaft 114 in such a manner that they too are heated by the recompressed steam. The steam flow is in series from the center shaft 114 to the outer steam jacket 122 to enable steam to blow-through and wipe condensate off the surface for better heat transfer, and to blow-through any non-condensible gases which may be trapped in the center shaft. Non-condensible gases are vented out the top of the cooker shell through a vent 130.

At the far end of the cooker, a separate hightemperature section 128 of the jacket is provided. Clean steam or pressurized hot water is supplied to the jacket section 128 through a line 132 and returned through a line 134. A heat exchanger 136 to which water is supplied derives its output heat from the hot exhaust gas of the engine 102. Moisture driven from the raw material by this final evaporation stage is cleaned of solid particulates in a cyclone separator 118 to which it is passed through the line 117. The solid particulates are returned to the cooker through a line 133 and the vapor is carried to the screw compressor 104 through the line 120.

Although FIG. 3 illustrates a system using heat available at three distinct temperature levels, it is apparent that additional preheating could be provided through use of heat contained in the hot contaminated condensate of the cooker, as described earlier with reference to FIGS. 1 and 2. Alternatively, if preheating of raw material is not desired or deemed necessary, the system of FIG. 3 can be simplified to twostaged heat recovery by eliminating the preheat section 108 and its water jacket 103 and the lines 106 and 110.

Although a gas engine, as noted, is highly desirable as the prime mover, any source of heat at various levels can be adapted to the disclosed system. The important element is the availability of heat at levels and quantities to match the requirements of the cooker. The system also lends itself to incorporation in a so-called co-generation arrangement with electrical power as a by-product. The basic rendering or other staged recompression process could be carried out during one period of the day and power could be sold during the periods when the basic process is not operative.

Because most facilities have boiler capacity available, the installation of a system based on the present invention can frequently be made without the need of additional new boiler capacity.

What is claimed is:

1. For use in combination with a rendering cooker having a plurality of stages and a hollow central shaft passing through selected stages of said plurality of stages, a system for upgrading and re-using low grade, contaminated steam generated by said cooker in evaporating water from raw materials comprising:

a screw compressor connected to said cooker and operable to compress low grade contaminated steam received from at least one of said selected stages to a relatively high pressure and temperature;

fluid jackets surrounding said selected stages of the cooker;

means for passing steam received from said screw compressor serially through said central shaft and at least some of said fluid jackets to heat said raw materials and to purge non-condensable gases from said central shaft;

a prime mover connected to, and operable to drive, said screw compressor;

means for producing hot water or steam from energy in the exhaust gases of said prime mover; and means for delivering said hot water or steam to at least one of said fluid jackets.

2. A method of utilizing energy efficiently in a cooker of a rendering system in which steam is used to heat raw materials to remove moisture from said materials comprising:

in a screw compressor, compressing low grade, contaminated steam liberated in the heating of raw materials in said cooker to produce steam of relatively high pressure and temperature;

passing said steam of relatively high pressure and temperature through a hollow central shaft of said cooker and then through a first fluid jacket surrounding a first portion of said cooker to heat said raw materials and to sweep non-condensible gases out of said shaft;

generating hot water or additional steam by heat exchange with exhaust gases of an engine drivably connected to said screw compressor, said hot water or additional steam having a higher temperture than the steam output of said screw compressor; and directing said hot water or additional steam to a second fluid jacket surrounding a second portion of said cooker to further heat and remove moisture from said raw materials.

3. A system as defined in claim 1 wherein said prime mover is a gas engine.

4. A system as defined in claim 1 wherein said prime mover includes cooling apparatus through whcih coolant flows, and said system further includes means for transferring heat from said coolant to one of said stages.

5. A system as defined in claim 1 including means connected between the inlet of said screw compressor and at least one of said selected stages for removing a portion of the solid particulates from low grade steam passing to said screw compressor and returning said removed particulates to said cooker.

6. A system as defined in claim 1 wherein said selected stages comprise a first evaporation stage for receiving steam of relatively high pressure and temperature from said screw compressor, and a second evaporation stage for receiving steam or hot water produced from energy in the exhaust gases of said prime mover, said second evaporation stage operable at a higher temperature than said first evaporation stage.

7. A method as defined in claim 2 further including recoverng heat from a coolant in said engine and using said recovered heat to preheat said raw materials.

* * * * *